United States Patent [19]
Schlecht

[11] 3,947,194
[45] Mar. 30, 1976

[54] APPARATUS FOR DAMPING THE PRESSURE INCREASE OF HYDROSTATIC DRIVES

[75] Inventor: Karl Schlecht, Bernhausen near Stuttgart, Germany

[73] Assignee: Putzmeister Interholding GmbH., Zurich, Switzerland

[22] Filed: Aug. 2, 1974

[21] Appl. No.: 494,172

Related U.S. Application Data

[62] Division of Ser. No. 333,652, Feb. 20, 1973, Pat. No. 3,854,847.

[30] Foreign Application Priority Data

Feb. 22, 1972 Germany.............................. 2208172

[52] U.S. Cl.................................. 417/212; 60/447
[51] Int. Cl.² ..................... F04B 49/00; F15B 15/18
[58] Field of Search ...... 60/444, 445, 447; 417/212, 417/218, 222

[56] References Cited
UNITED STATES PATENTS

| | | | |
|---|---|---|---|
| 3,217,493 | 11/1965 | Kempson | 60/444 |
| 3,543,508 | 12/1970 | Schwab | 60/445 |
| 3,603,084 | 9/1971 | Okazaki | 60/447 |
| 3,650,108 | 3/1972 | Isaac | 60/444 |
| 3,660,975 | 5/1972 | Martin | 60/444 |

Primary Examiner—William L. Freeh
Assistant Examiner—Gregory LaPointe
Attorney, Agent, or Firm—Werner W. Kleeman

[57] ABSTRACT

An apparatus for damping the pressure increase of hydrostatic drives, especially axial piston pumps, with swash plate control and pre-biased oil circulation, wherein the pressurized oil compartment of an adjustment cylinder is connected with the low pressure side of the oil infeed of the pump via a check or nonreturn valve which opens in the direction of the low pressure conduit of the oil infeed. There is further provided a supply pump and a mechanical adjustment mechanism. The adjustment cylinder is rigidly connected with the mechanical adjustment and the bottom side of the adjustment cylinder is connected via a regulation throttle and a check valve means with the pressure side of the supply pump.

1 Claim, 2 Drawing Figures

APPARATUS FOR DAMPING THE PRESSURE INCREASE OF HYDROSTATIC DRIVES

CROSS-REFERENCE TO RELATED CASE

This is a divisional application of my commonly assigned, copending U.S. application Ser. No. 333,652, filed FEB. 20, 1973 now U.S. Pat. No. 3,854,847.

BACKGROUND OF THE INVENTION

The present invention relates to a new and improved construction of apparatus for damping the pressure increase of hydrostatic drives wherein a controllable axial piston pump, preferably equipped with a swash or wobble plate, drives a motor or selectively the hydraulic cylinder of a concrete pump.

With such type drives oftentimes there occur rapid load changes at the motor, even if such operates at a constant rotational speed. In the case of concrete pumps operating according to a rotor principle or piston displacement principle, such is the case if, after each stroke change or after each operable activity of a displacement roller, the concrete column, which is at rest during the stroke change in the conveying line, again must be accelerated. The rotational movement of the oil motor or the speed of the piston rods of the conveying cylinder is always a uniform one because it is acted upon by a displacement pump.

The large forces required for the renewed acceleration of the concrete column leads to a brief high pressure increase at the high pressure side of the drive. The pressure peaks are so high that the overpressure valve responds and there is perceivable a certain development of heat. On the other hand, the sudden accelerated concrete column produces undesirable reaction forces which, for instance, can result in the concrete line or conduit being exposed to impacts.

In order to overcome these drawbacks it would be conceivably possible, after each stroke reversal or change, to rock the hydraulic pump into its null conveying position and to allow such to be slowly controlled in order to realize a slow feed of the concrete column. Yet in practice this is not possible for a number of reasons, particularly also because the time-span between the point in time of reversing the control of the conveying pistons and the moment at which such impinge against the concrete columns and begin to accelerate such occur quite differently, depending upon the composition of the concrete and the operating speed of the pump.

To avoid such acceleration peaks which oftentimes exceed 200% of the conveying pressure, it is equally not possible to employ the known pressure compensation. During conveying of the concrete the pressure level continuously changes because the consistency of the concrete and the length of the conveying conduit or line varies.

SUMMARY OF THE INVENTION

Hence, it will be recognized that this particular field of technology is still in need of apparatus for damping the pressure increase at hydrostatic drives in a manner which effectively and reliably overcomes the aforementioned drawbacks existing in the state-of-the-art constructions. It is therefore a primary object of the present invention to provide an apparatus which effectively and reliably fulfills the needs existing in the art and overcomes the aforementioned drawbacks present with the prior art constructions.

Another and more specific object of the present invention aims at limiting the speed of increase of the pressure whenever the pressure increase occurs and irrespective of its magnitude, and specifically particularly during constant rotational speed of the pump or the oil motor or during uniform speed of the conveying cylinder.

Now in order to implement these objects and others which will become more readily apparent as the description proceeds, the invention proposes a novel solution while resorting to the use of a phenomenon which previously was considered to be disadvantageous. In most of the hydrostatic pumps, especially however axial piston pumps with swash or wobble plate control, during the pressure increase there occurs an increased escape of leakage oil. This can be essentially explained in terms of the variable gap widths under which the control plates of such pumps move towards one another with and without pressure. With a closed circulatory flow, this leads to the result that with a sudden pressure increase the conveyed quantity of the supply pump is often not sufficient. As a result, the pre-bias of the oil collapses at the low pressure side, leading to annoying and damaging cavitation effects. As soon as the maximum pressure has been reached, the escape of leakage oil again assumes normal values.

Since most of the hydraulic pumps in modern drives are no longer mechanically controlled as concerns their conveying length, rather through the agency of hydraulic adjustment cylinders, for instance as a function of the rotational speed of the drive motor, the invention proposes that with a hydraulic pump, preferably an axial piston pump having a swash or wobble plate control, and which pump is equipped with a hydraulic adjustment cylinder and at the pre-biased oil circulation system with a supply pump and the therewith associated conventional filling pressure limiting devices, flushing and reversing valves, the pressurized oil compartment of the adjustment cylinder is connected with the low pressure side oil circulation system of the pump via a check valve. When there is a pressure drop at the low pressure side owing to an increased leakage oil consumption, pressurized oil flows out of the control cylinder through the check valve to the low pressure side of the pump and this check valve then prevents flow of the oil in the opposite direction. Consequently, there is thus temporarily prevented rocking or swiveling of the pump and therefore the pressure increase velocity at the pressure line.

With the apparatus of the type proposed by the invention, wherein the conveyed quantity is controlled independently of the conveying pressure by means of internal servo-adjustment of the swash or wobble plate, the servo-control advantageously embodies an external adjustment lever hinged with the outer adjustment cylinder, and the inner adjustment cylinder likewise possesses a connection with the low pressure line in which the check valve is arranged. The outer adjustment cylinder advantageously possesses a spring, the restoring force of which corresponds to a pressure which is only slightly less than the pressure prevailing at the low pressure line of the pump. Both the outer adjustment cylinder as well as also the low pressure line connected with such cylinder via the check valve as well as also the servo-valve are supplied by an external auxiliary pump.

An advantageous further embodiment of the apparatus consists in the features that the servo-valve is coupled via a check valve with the auxiliary pump. The supply pump which is usually flanged to the pump can then be dispensed with for this type of modified equipment.

A further variant construction of the apparatus of this development contemplates that when dispensing with the use of an auxiliary pump and a throttle arranged after such auxiliary pump, the adjustment cylinder is connected with a mechanical adjustment mechanism and the side at the floor or bottom of the adjustment cylinder is connected via a regulating throttle and a check valve with the servo-control pressure side of the pump.

BRIEF DESCRIPTION OF THE DRAWINGS

The invention will be better understood and objects other than those set forth above, will become apparent when consideration is given to the following detailed description thereof. Such description makes reference at the annexed drawings wherein.

DETAILED DESCRIPTION OF THE PREFERRED EMBODIMENTS

Figure 1:
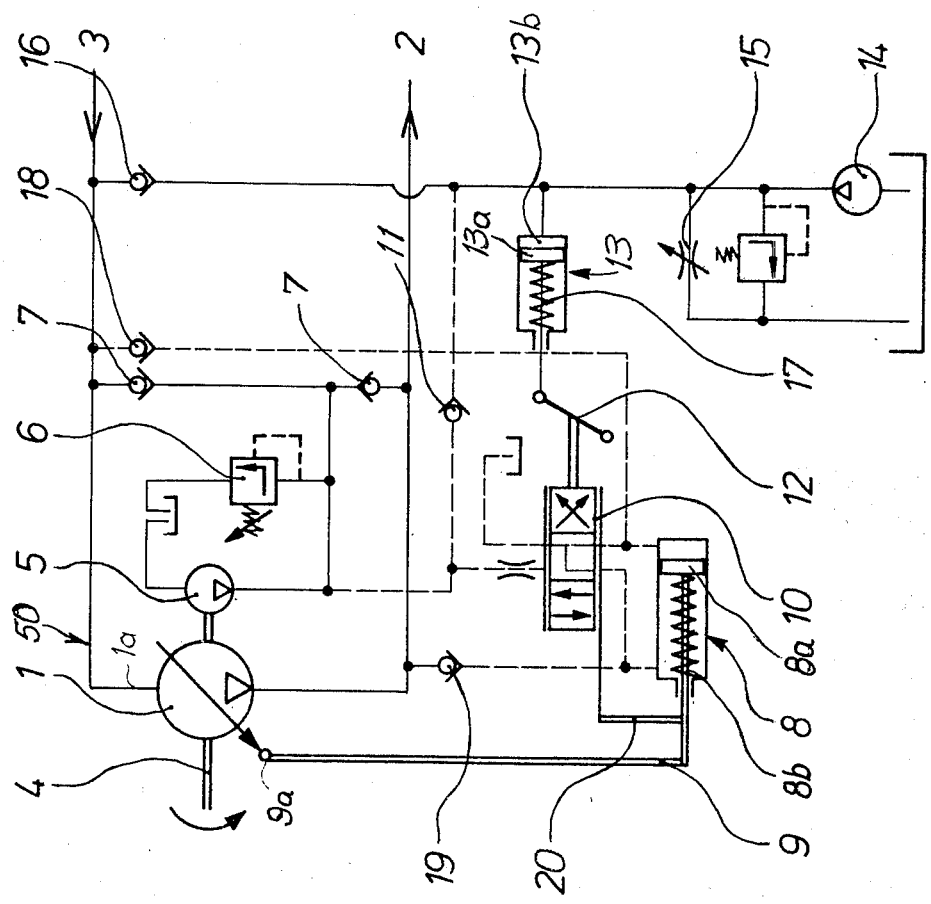
FIG. 1 illustrates an exemplary embodiment of apparatus possessing an internal servo-adjustment of the swash or wobble plate of an axial piston pump and an auxiliary pump.

Describing now the drawings, it is to be understood that at the momentary low pressure side 1a of the main circulation system 50 of the pump 1, oil is conveyed from a supply pump 5, which is protected by a filling pressure-safety valve 6, through the agency of a check valve or nonreturn valve 7. For the sake of simplicity in illustration, the circulation system has only been depicted for a non-reversible pump which conveys in one direction. The supply pump 5 also conveys oil to a servo-valve mechanism 10 by means of which the piston 8a of an inner or internal adjustment cylinder 8 can be outwardly displaced or ejected. The piston rod 8b thereof is connected via a rigid mechanical connection 9 with an adjustment element, schematically indicated at 9a, of a conventional and therefore not particularly illustrated swash plate of the pump 1. Between the piston rod 8b of the adjustment cylinder 8 and the servo-valve mechanism 10 there is provided a mechanical return device 20. As soon as a shaft 4 drives the pump 1 then this pump, by means of a servo-adjustment, is switched to the desired delivery capacity when the adjustment lever 12 of the servo-valve mechanism 10 is rocked out of its null position. This occurs under the action of the external or outer hydraulic adjustment cylinder 13, the piston 13a of which is retained in its null position through the agency of a return spring 17. In the embodiment under consideration the required adjustment pressure is generated by an auxiliary pump 14 which, as a general rule, is driven by the same motor as the pump 1 and therefore has a rotational speed proportional to the pump 1 and conveys in the direction of a regulation throttle 15.

With a certain adjustment of the throttle 15 the control oil pressure which is effective in the adjustment cylinder 13 increases proportionally as a function of the rotational speed of the drive motor. At a certain rotational speed the pre-bias force of the spring 17 is overcome, the piston 13a of the adjustment cylinder 13 is displaced within the compartment 13b of the adjustment cylinder 13, and therefore, the pump 1 is switched over into its delivery or conveying mode via the servo mechanism 10 which is acted upon by the adjustment lever 12. The auxiliary pump 14 generates a maximum oil pressure which, limited by the throttle 15 and, if desired, a further overpressure valve, preferably is at a value slightly below the low pressure prevailing in the conduit or line 3.

Now if with a constant rotational speed there occurs an operating condition for the main pump 1 which results in a rapid rather pronounced pressure increase at the high pressure conduit or line 2, then there is an increased leakage oil escape out of the closed working circuit into the pump housing which is vented to the tank and which with normal dimensioning of the supply pump 5 can no longer be made up by the latter. As a result, there is present a pressure drop at the low pressure line 3 and therefore the danger that cavitation effects occur. However, such is prevented by the check valve 16 through which the pressurized oil flows into the low pressure line 3 from the auxiliary pump 14 or the control chamber of the adjustment cylinder 13. With an auxiliary pump 14 which is designed as concerns its delivery capacity to the corresponding operating conditions, the return spring 17 accordingly can displace the piston 13a through a greater or lesser extent into the adjustment cylinder 13. As a result the conveyed quantity of the main pump 1 is temporarily reduced via the adjustment lever 12 and the servo-mechanism 10 and specifically for such length of time as there exists the increased consumption of leakage oil due to the increase in pressure and which exceeds the delivery capacity of the supply pump 5 and the auxiliary pump 14.

Due to this cooperative action there is not only madeup the increased leakage oil consumption of the pump but at the same time owing to the reduction of the angle of attack of the wobble plate the pressure increase is limited by the reduced delivered capacity or conveyed quantity. The speed of the pressure increase can be controlled in a simple manner in that the delivered capacities of the supply pump 5 and the auxiliary pump 14 are coordinated to one another. For instance, the supply pump 5 can possess a constant delivery capacity starting from a certain rotational speed; the main pump then operates at high rotational speeds and higher pressure loads in an increasing softer manner with respect to the pressure increase.

With a pressure drop in the low pressure conduit or line 3 there is not only infed thereto oil from the outer adjustment cylinder 13 but also from the inner adjustment cylinder 8 via the check valve 18.

Figure 2:
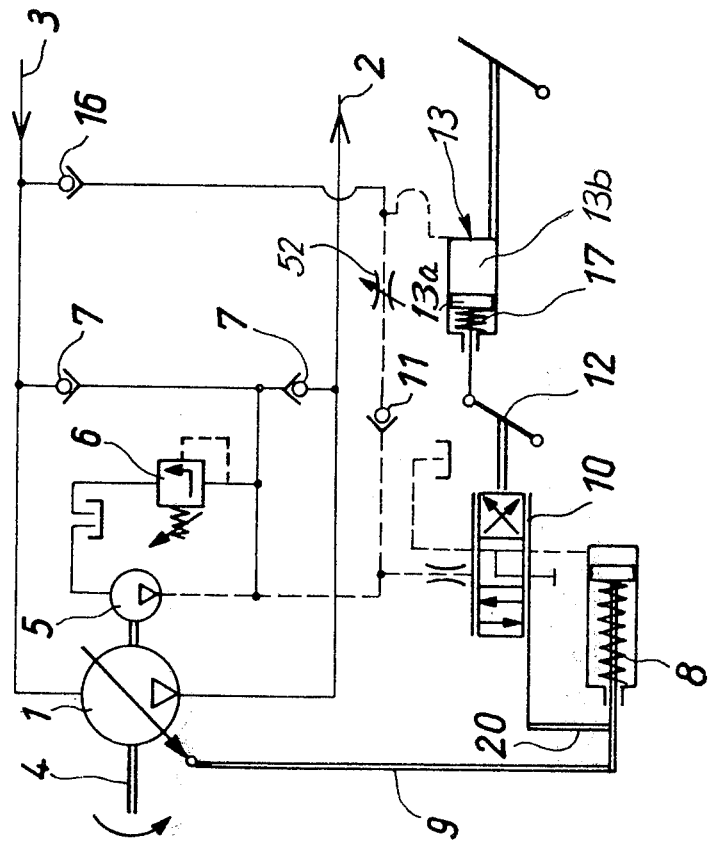
FIG. 2 is a modified form of the apparatus depicted in FIG. 1 without an auxiliary pump.

Now with the modified version of equipment as depicted in FIG. 2, and wherein here no auxiliary pump is provided, the housing of the adjustment cylinder 13 is rigidly connected with a mechanical adjustment mechanism. The adjustment cylinder 13 serves as an intermediate element in the mechanical adjustment. The floor or bottom side of the adjustment cylinder 13 is continuously connected via a regulation or control throttle 52 and a check valve 11 with the servo-control pressure side of the supply pump 5.

If the pump is mechanically switched into its conveying or delivery mode and if during operation thereof there occurs a sudden increase in pressure, then, the piston 13a of the adjustment cylinder 13 can temporarily discharge fluid via the check valve 16 into the low pressure conduit or line 3. The compartment 13b of the adjustment cylinder 13 is less rapidly charged by the supply pump 5. As a result, there is a temporary pivoting back of the adjustment lever 12, that is to say, a decrease in the delivery or conveying capacity of the pump 1 with subsequent repositioning of the adjustment lever after the pressure increase in the main conduit or line 2 has slowly been completed.

The speed of the pressure increase is limited in known manner for all servo-controlled pumps by an inflow throttle arranged forwardly of the servo-slide valve mechanism 10, which can also be designed to be controllable. An apparatus of the described type can also be separately installed in a very simple manner as a supplementary unit at drives of this type which are already in operation.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for damping the pressure increase of hydrostatic drives, especially axial piston pumps with swash plate control and pre-biased oil circulation system, the improvement comprising an adjustment cylinder having a pressurized oil compartment, a pump, an oil infeed means including an oil infeed line for the pump, a first check valve, the pressurized oil compartment of the adjustment cylinder being flow connected with the low pressure side of the oil infeed line of the pump via said first check valve, said first check valve opening in the direction of the low pressure infeed line, a servo-adjustment means including an external adjustment lever hingedly connected with the adjustment cylinder, a supply pump, a mechanical adjustment mechanism, said adjustment cylinder being rigidly connected with and axially movable by the mechanical adjustment mechanism, the pressurized oil compartment of the adjustment cylinder being connected via a regulation throttle and a second check valve with the pressure side of the supply pump.

* * * * *